(12) United States Patent
Tokumatsu et al.

(10) Patent No.: US 6,750,945 B2
(45) Date of Patent: Jun. 15, 2004

(54) IMAGE DATA STORAGE APPARATUS FOR STORING SCANNED IMAGE DATA

(75) Inventors: Yoshiharu Tokumatsu, Wakayama (JP); Satofumi Matsuyama, Wakayama (JP)

(73) Assignee: Noritsu Koki Co., Ltd., Wakayama-Ken (JP)

(*) Notice: Subject to any disclaimer, the term of this patent is extended or adjusted under 35 U.S.C. 154(b) by 0 days.

(21) Appl. No.: 10/393,476

(22) Filed: Mar. 20, 2003

(65) Prior Publication Data

US 2003/0202103 A1 Oct. 30, 2003

(30) Foreign Application Priority Data

Mar. 25, 2002 (JP) .................................. 2002-083879

(51) Int. Cl.$^7$ .............................................. G03B 27/52
(52) U.S. Cl. ..................... 355/18; 355/41; 396/567; 396/670
(58) Field of Search ................. 355/18, 40, 41, 355/77; 356/567–570

(56) References Cited

U.S. PATENT DOCUMENTS

| | | | |
|---|---|---|---|
| 6,169,596 B1 | | 1/2001 | Shiota |
| 6,480,673 B2 | * | 11/2002 | Liebenow ............... 355/40 |
| 6,520,694 B1 | * | 2/2003 | Hall et al. .............. 396/567 |
| 6,554,504 B2 | * | 4/2003 | Cook et al. ............. 396/567 |
| 6,628,899 B1 | * | 9/2003 | Kito ....................... 355/40 |

FOREIGN PATENT DOCUMENTS

JP    2000-354123 A    12/2000

* cited by examiner

*Primary Examiner*—D. Rutledge
(74) *Attorney, Agent, or Firm*—Fulbright & Jaworski LLP

(57) ABSTRACT

An image data storage apparatus comprising an image data recording means for retrievably recording a scanned imaged data, and a branch transmission path for transmitting the scanned image data from a film reader to the image processor and/or the image data recording means. The apparatus further comprises means for switching the transmission mode to enable the image processor to receive the scanned image data retrieved from the image data recording means.

4 Claims, 4 Drawing Sheets

IMAGE DATA STORAGE APPARATUS FOR STORING SCANNED IMAGE DATA

BACKGROUND OF THE INVENTION

1. Field of the Invention

The present invention relates to an image data storage apparatus for storing scanned image data. The storage apparatus is adapted to be connected to a photographic printing system including a film reader for reading images of frames of a photographic film, an image processor for generating image data to be printed, based on scanned image data generated from the film reader, and a printing means for printing images on a recording medium based on the printing image data.

2. Description of the Related Art

A digital type photographic printing system often installed in a photographic developing/printing service shop includes, as its main component, an image processing unit for processing digitized image data. This image processing unit generates image data to be printed by the printing means, based on scanned image data of the photographic film frame images read by the film reader. And, based on the generated image data, the printing means prints frame images on a variety of recording media such as a print paper, a recording paper or the like.

The basic task of such photographic printing system is to receive a customer's order for printing of a photographic film and then to make the requested prints. Hence, according to the convention, in the case of a so-called reprinting also, upon receipt from a customer a photographic film including a frame image to be reprinted, this frame image is read again by the film reader and then reprinted. However, if a photographic film is charged into the film reader for each occasion of its reprinting, this may damage the film. Or, a customer may have lost the film at all.

In order to avoid such problem, according to a system known from e.g. Japanese Patent Application "Kokai" No: 2000-354123, when a photographic print was once produced based on image data transmitted from the film reader, this image data used for the production of the photographic print is stored in a storage unit of the image processor and then recorded in a long-term storage medium such as a hard disc or a CD-R to be ready for use in a reprinting operation which may be needed in future. However, if the photographic printing system has to provide such additional function of recording image data on such recording medium, this will require significant hardware and/or software modification of the system. Moreover, in recording the image data, if the data is subjected to an irreversible compression such as in the JPEG format in consideration of storage capacity of the recording medium, image quality deterioration will occur when the compressed image data is decompressed.

According to a further system known from e.g. U.S. Pat. No. 6,169,596, the system includes an image server provided between the film reader and a printer (image processor) for temporarily storing scanned image data transmitted from the film reader, with allowing retrieval of the image data when needed. With this system providing the function of temporary storage of scanned image data from a film reader, however, when an occasion arises for urgent production of a print of a photographic film, it will take a considerable time for the image server to relay (involving reading and writing of the data) the scanned image data which usually has a significant data size.

SUMMARY OF THE INVENTION

The present invention has been made in view of the above-described state of the art. The principal object of the invention is to provide possibility of storage of image data of a frame image of a photographic film transmitted from the film reader, with minimizing reduction in the overall processing speed of the photographic printing system.

For accomplishing the above-noted object, the invention proposes an image data storage apparatus which comprises: an image data recording means for retrievably recording scanned image data generated by a film reader; a branch transmission path for allowing the scanned image data being transmitted from the film reader to an image processor of a photographic printing system to be transmitted also to said image data recording means; and means for switching over between a mode for transmitting the scanned image data from the film reader to the image processor and a further mode for transmitting the scanned image data retrieved from said image data recording means to the image processor.

Namely, according to the above-described construction proposed by the present invention, when the scanned image data read by the film reader is transmitted to the image processor for generating printing image data and to the image data storage apparatus for storing the scanned image data, instead of transmitting the scanned image data individually to the processor and also to the storage apparatus, the branch transmission path functions to allow the scanned image data being transmitted from the film reader to the image processor to be directly transmitted to the image data recording means of the image data storage apparatus.

Therefore, the film reader can transmit the scanned image data to both the image processor and the image data storage apparatus, as if transmitting the data only to the image processor. As a result, the image data storage apparatus can store the scanned image data of the frame image of the photographic film, with substantially no reduction in the processing speed of the photographic printing system.

Looking this differently from a perspective of the image processor, although the image processor basically functions to receive scanned image data from the film reader as its main source of such scanned image data, with switchover by the switchover means to the further mode for receiving scanned image data from the image data storage apparatus, the processor can receive the scanned image data stored in the image data storage apparatus, just like receiving the scanned image data from the film reader.

According to one preferred embodiment of the invention, the image data storage apparatus further comprises a transmission path branching unit for connecting said branch transmission path to an intermediate position on a data transmission path from the film reader to the image processor. That is, the transmission path branching unit provides the branch transmission path branching from the intermediate portion of the transmission path extending from the film reader to the image processor. This construction allows addition of the branch transmission path, while minimizing associated change required for that addition in the configurations of the film reader and the image processor from the standard apparatus construction having the transmission path for transmitting scanned image data from the film reader to the image processor, thus minimizing additional cost of the apparatus.

According to a further embodiment of the invention, said image data recording means is adapted for storing the scanned image data in a plurality of hard disc units and also for dividing the scanned image data to be distributed to the plurality of hard disc units to be stored therein respectively; and the apparatus further comprises writing controlling means for causing the respective hard disc devices to write the distributed data therein in a parallel manner. In the case of the above-described apparatus construction which allows the scanned image data being transmitted from the film reader to the image processor to be transmitted directly also to the image data storage apparatus, if the storage processing speed of the image data storage apparatus is low, this will inevitably result in reduction in the transmission rate of the scanned image data from the film reader to the image processor. On the other hand, if the recording medium for the image data provided in the image storage apparatus is constructed of a semiconductor memory capable of high-speed writing in order to be allow storage of a large amount of image data, this will significantly increase the apparatus cost. Then, the above construction employs a plurality of hard disc units each of which is less capable of high-speed writing than the semiconductor memory, but is available at relatively low costs and divides the scanned image data received from the film reader to be distributed to these hard disc units respectively so that the hard disc units write the data in parallel manner. With this, the storage processing speed of the image storage apparatus can be improved while restricting increase in the total apparatus cost.

According to a still further embodiment of the invention, said writing controlling means designates a writing position of the scanned image data for each hard disc unit such that the unit writes the data sequentially in consecutive physical sectors of the unit. That is to say, when each hard disc unit writes the scanned image data transmitted from the film reader, the unit writes the data in its consecutive physical sectors thereof, rather than making a so-called system file for writing the scanned image data in an appropriate vacant area thereof. This construction is advantageous for restricting the amount of seek movement of the recording head of the hard disc unit required for the writing operation, whereby the writing operation to the hard disc unit can be carried out even more speedily.

Further and other features and advantages of the invention will become apparent upon reading the following detailed description of the preferred embodiments with reference to the accompanying drawings.

DESCRIPTION OF THE PREFERRED EMBODIMENTS

Preferred embodiments of a photographic printing system including an image data storage apparatus of the invention will be described with reference to the drawings.

The photographic printing system DP illustrated in this embodiment is known as a digital "Mini-Lab". As shown in the block diagram of FIG. 1, this system DP includes an image inputting device IR reading image data for making its photographic prints from a developed photographic film, a memory card, MO, CD-R or the like and generating exposure image data (image data to be exposed), and an exposing/developing device EP for exposing a print paper 1 as an image recording medium PM with the exposure image data generated by the image inputting device IR.

[General Construction of Image Inputting Device IR]

Figure 1:
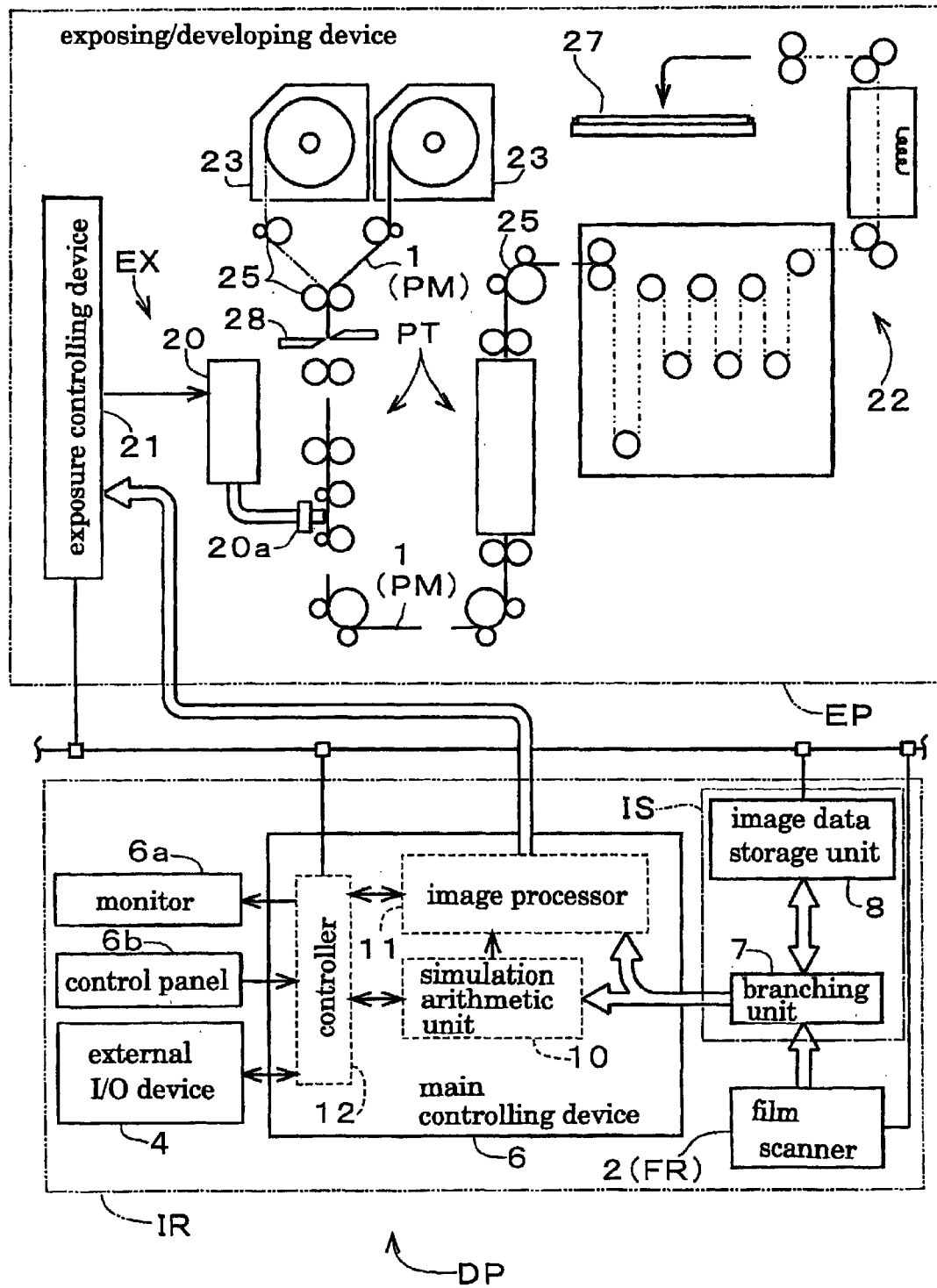
FIG. 1 is a block diagram of a photographic printing system using an image data storage apparatus relating to the present invention.

This image inputting device IR, as shown schematically in FIG. 1, includes a film scanner 2 as a film reader FR for reading (scanning) images of respective frames of a photographic film, an image data storage apparatus IS for storing the scanned image data of the photographic film outputted from the film scanner 2, an external I/O (input/output) device 4 having a memory reader, MO drive, a CD-R drive etc., and a main controlling device 6 for controlling the film scanner 2 and effecting also overall control of the photographic printing system DP. Further, the main controlling device 6 is connected to a monitor 6a for displaying various information including a simulation image of a finished print image and also to a control panel 6b for allowing inputs of manual setting of the exposure condition and other control information.

[Construction of Main Controlling Device 6]

The main controlling device 6, as shown schematically in FIG. 1, includes a simulation arithmetic unit 10 for effecting an arithmetic operation for producing the simulated print image simulating a finished print image which would be obtained based on the scanned image data inputted from the film scanner 2 and the image data storage apparatus IS, an image processor 11 for generating, based on the scanned image data inputted from the film scanner 2 and the image data storage apparatus IS, printing image data, i.e. the exposure image data according to which the exposing/developing device EP is to be operate for the exposure and a controller 12 for controlling the operations of the above device components.

The controller 12 is connected in a network with the image data storage apparatus IS, the film scanner 2 and an exposure controlling device 21 to be described later, so as to control transmission and reception of control information between these components.

[Construction of Image Data Storage Apparatus IS]

Figure 2:
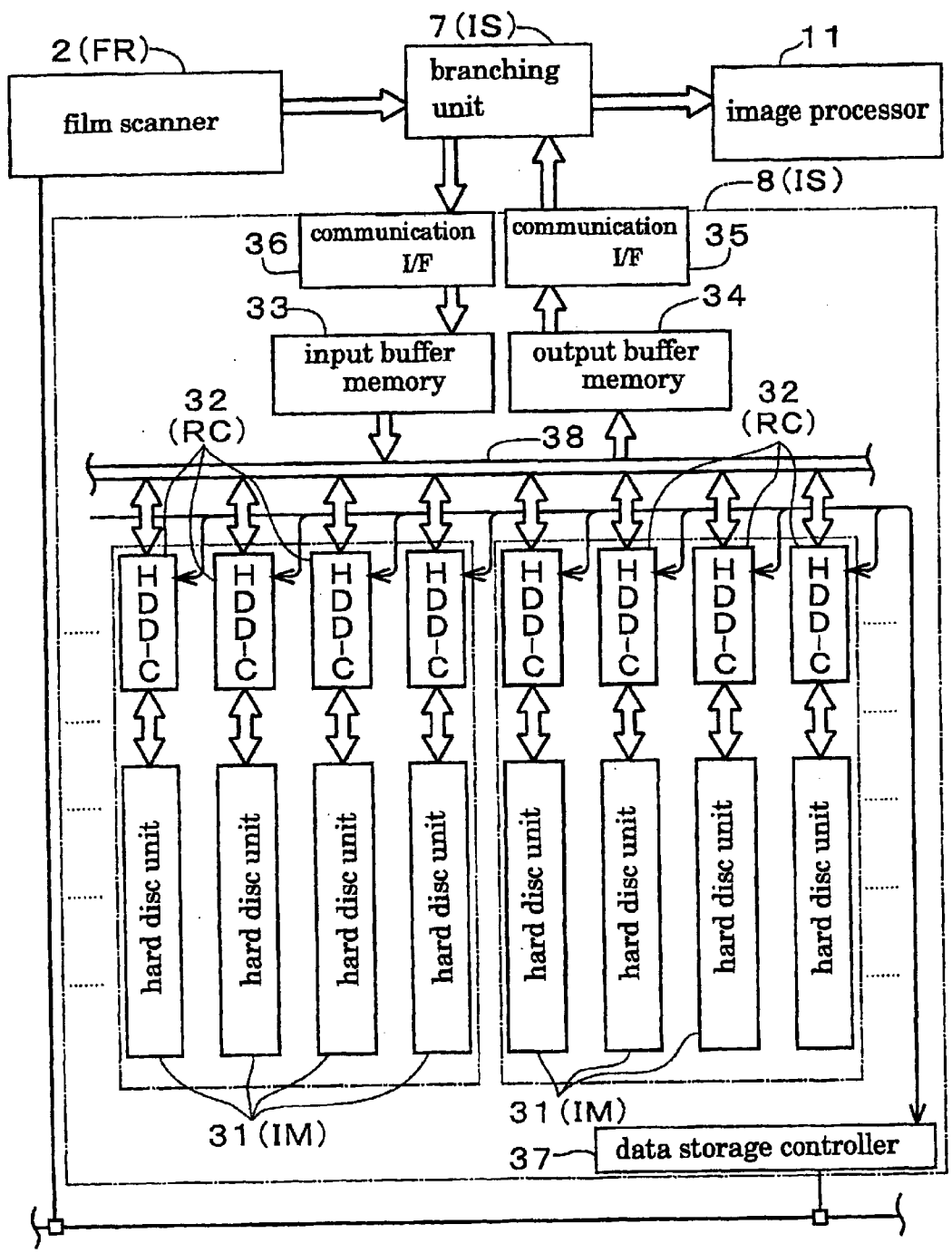
FIG. 2 is a block diagram of an image data storage unit of the image data storage apparatus.

The image data storage apparatus IS, as shown in the block diagrams of FIG. 1 and FIG. 2, includes an image data storage unit 8 for storing the scanned image data, and a transmission path branching unit 7 (denoted simply as "branching unit" in the drawings) for branching a transmission path for the scanned image data outputted from the film scanner 2 to the image data storage unit 8.

[Construction of Image Data Storage Unit 8]

The image data storage unit 8, as shown in the block diagram of FIG. 2, includes a number of hard disc units 31 together acting as image data recording means IM, HDD controllers 32 (denoted as "HDD-C" in the figure) for controlling the respective hard disc units 31, an input buffer memory 33 for temporarily holding the scanned image data to be written into the hard disc units 31, an output buffer memory 34 for temporarily holding the scanned image data to be outputted from the respective hard disc units 31, transmitting and receiving communication interfaces 35, 36, and a data storage controller 37 for controlling reading/writing of the scanned image data from and to the respective hard disc units 31. Hence, this image data storage unit 8 is capable of storing scanned image data of a plurality of photographic films read by the film scanner 2.

[Construction of Transmission Path Branching Unit 7]

Figure 3:
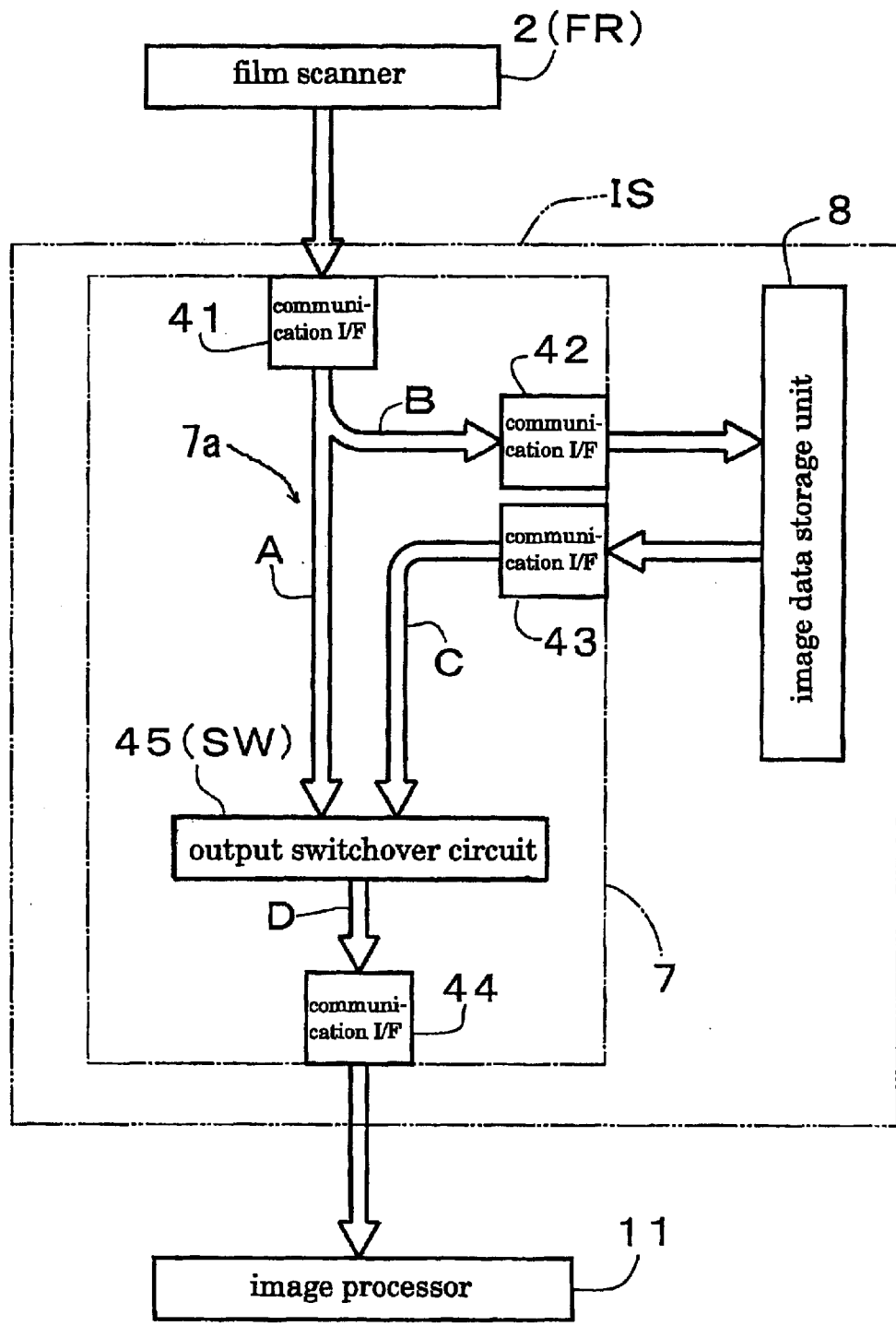
FIG. 3 is a block diagram of a transmission path branching unit included in the image data storage apparatus.

The transmission path branching unit 7, as shown schematically in FIG. 3, includes a receiving communication interface 41 for receiving the scanned image data from the film scanner 2, transmitting and receiving communication interfaces 42, 43 respectively for transmitting and receiving the scanned image data relative to the image data storage unit 8, a transmitting communication interface 44 for transmitting the scanned image data to the image processor 11, and an output switchover circuit 45 for selectively connecting either a communication line from the film scanner 2 or a signal line from the image data storage unit 8 to the communication interface 44.

A signal path A for the scanned image data extending from the communication interface 41 to the output switchover circuit 45 is branched in midway thereof to a signal path B extending to the communication interface 42, thereby to form a branch transmission path 7a which allows the scanned image data being transmitted from the film scanner 2 to the image processor 11 to reach directly transmitted to the hard disc units 31 of the image data storage unit 8.

That is to say, the transmission path branching unit 7 is provided for connecting the branch transmission path 7a to an intermediate portion of the transmission path extending from the film scanner 2 to the image processor 11.

On the other hand, when the scanned image data stored in a hard disc unit 31 of the image data storage unit 8 is retrieved via the branch transmission path 7a, this data is transmitted along a signal path C via the communication interface 43 to reach the output switchover circuit 45. In accordance with an instruction from the data storage controller 37 of the image data storage unit 8, the output switchover circuit 45 selects the signal path A to connect it to the signal path D extending to the communication interface 44 when the scanned image data is to be transmitted from the film scanner 2 to the image processor 11 and alternatively selects the signal path C to connect it to the signal path D when the scanned image data is to be retrieved from the image data storage unit 8. Therefore, this output switchover circuit 45 functions as a switchover means SW for switching over between a mode for causing the image processor 11 to receive the scanned image data from the film scanner 2 and a further mode for causing the image processor 11 to receive the scanned image data from the image data recording means IM (hard disc units 31).

Incidentally, the communication interfaces 35, 36, 41, 42, 43 and 44 together constitute a communication network for transmitting and receiving clock signals and the scanned image data synchronized with the respective clock signals at a high speed.

[Description of Storing and Reading Operations of Scanned Image Data]

Next, with reference to the flowchart of FIG. 4, there will be described a control scheme executed by the data storage controller 37 of the image data storage unit 8 for controlling the operation for storing the scanned image data outputted from the film scanner 2 into the image data storage device IS and the operation for retrieving the scanned image data stored at the image data storage apparatus IS and outputting it to e.g. the image processor 11.

Figure 4:
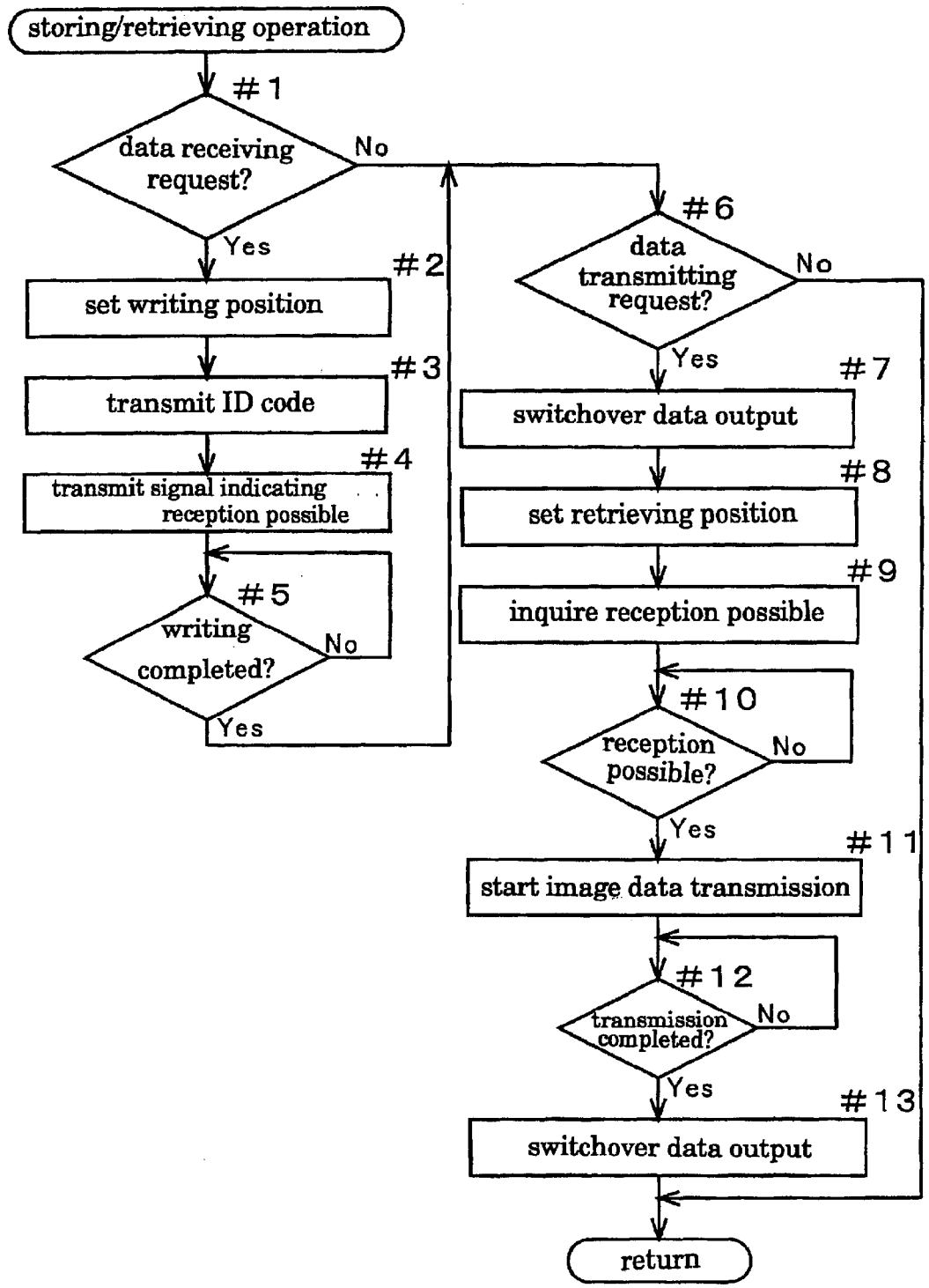
FIG. 4 is a flowchart relating to scanned image data transmission in the image data storage apparatus.

The data storage controller 37 executes the control scheme shown in FIG. 4 at high speed in repetition and stands by for receiving, via the network, a request for receiving the scanned image data from the film scanner 2 (step #1) or a request for transmitting the scanned image data fro the controller 12 of the main controlling device 6 (step #6).

After reading frame images of one roll of a photographic film, the film scanner 2 transmits via the network the request for receiving the scanned image data to the controller 12 of the main controlling device 6 and also to the image data storage apparatus IS and stands by for receiving from them signals indicating they are ready for receiving the scanned image data.

Upon receipt of this request for receiving the scanned image data from the film scanner 2 (step #1), the data storage controller 37 of the image data storage unit 8 designates at which of the hard disc units 31 and from which writing position of that hard disc unit the scanned image data to be received is to be written and instructs the HDD controller 32 for controlling the designated hard disc unit 31 to write the data and instructs also the writing start position in the physical sectors of the unit 31 (step #2). Thereafter, the controller 37 transmits an ID code for this one photographic film roll amount of the scanned image data to the controller 12 of the main controlling device 6 (step #3) and transmits also a signal to the film scanner 2 that the requested reception of the scanned image data is now possible (step #4).

Upon reception of signals from both the controller 12 of the main controlling device 6 and the data storage controller 37 of the image data storage unit 8 indicating that they are ready for receiving the scanned image data, the film scanner 2 starts transmitting the scanned image data of the one roll of photographic film.

This scanned image data transmitted from the film scanner 2 is received first by the communication interface 41 of the transmission path branching unit 7 and then transmitted from the communication interface 44 to the image processor 11 via the signal path A and the signal path D and transmitted also from the communication interface 42 to the image data storage unit 8 via the signal path B.

At the image data storage unit 8, when the scanned image data transmitted from the communication interface 42 of the transmission path branching unit 7 is received by the communication interface 36, this scanned image data is written sequentially into the input buffer memory 33. As this input buffer memory 33 makes adjustment in variation in the writing speed of the hard disc unit 31, the image data storage unit 8 can continuously receive the high-speed stream of scanned image data.

The input buffer memory 33 outputs the scanned image data on a data bus 38 in synchronized response to a data request signal outputted from the HDD controller 32. The data bus 38 has 64 bit data width configuration. So that, when the input buffer memory 33 outputs the scanned image data onto the data bus 38, it outputs 4 units of the scanned image data each received with 16 bit data width together as 64 bit data to the data bus.

The image data storage unit 8 controls the number of hard disc units 31 in such a manner that a group of hard disc units 31 controlled by four HDD controllers 32 are controlled as one unit. The scanned image data input of each HDD controller 32 has 16 bit data width. Then, the total 64 bits data width of the data bus 38 is divided into 4 segments and a data line of one segment is connected to each of the four HDD controllers 32 together constituting one group. With these arrangements, the scanned image data received from the film scanner 2 is divided and distributed to the plurality (4 units) of hard disc units 31.

Therefore, at step #2, the data storage controller 37 instructs the writing of the scanned image data at one time to the four HDD controllers 32. Then, each of these four HDD controllers 32 instructed by the data storage controller 37 for writing of the scanned image data, proceeds to sequentially write its corresponding 16 bits amount of the 64 bits data sequentially outputted onto the data bus 38 from the input buffer memory 33 into the hard disc units 31 from the writing start position designated by the data storage controller 37. That is to say, this wiring operation takes place in parallel manner in the four hard disc units 31.

In the above, while receiving the scanned image data, the HDD controller 32 continuously changes the writing position so that the scanned image data may be written continuously in consecutive physical sectors of the hard disc unit 31.

Upon receipt of signal from the HDD controller 32 indicating that the writing operation of one film roll amount of scanned image data is completed (step #5), the data storage controller 37 returns to the mode for waiting for a receiving via the network the request for receiving the scanned image data from the film scanner 2 (step #1) or the request for transmitting the scanned image data from the controller 12 of the main controlling device 6 (step #6).

As described above, the HDD controller 32 functions as writing controlling means RC for causing the respective hard disc units 31 to carry out the writing operations in parallel manner.

On the other hand, in case the scanned image data is to be retrieved from the image data storage apparatus IS, upon receipt of an output request for the scanned image data with its ID code designation from the controller 12 of the main controlling device 6 (step #6), a signal is transmitted to the output switchover circuit 45 of the transmission path branching unit 7 for outputting the inputting scanned image data to the communicating interface 44 via the signal path C (step #7).

Thereafter, the information relating to a particular hard disc unit 31 stored as the location where the scanned image data of the photographic film identified by the ID code received from the controller 12 as well as the writing position of the data therein is transmitted to the HDD controller 32 associated therewith (step #8). In the case of this retrieval of the scanned image data also, the above-described information including the writing position is transmitted at one time to the four HDD controllers 32 constituting one group.

When the system becomes ready for data output as described above, the process inquires the controller 12 whether the reception of the scanned image data is possible or not (step #9). Upon reception of a signal indication that the reception is possible (step #10), the process starts transmission of the scanned image data (step #11).

With this, from each of the four HDD controllers 32, the 16 bits width of scanned image data retrieved from the designated position in the four hard disc units 31 is outputted sequentially onto the data bus 38 and this data is outputted via the output buffer memory 34 and the communication interface 35 to the transmission path branching unit 7.

This scanned image data received by the transmission path branching unit 7 is then outputted via the communication interface 43, the output switchover circuit 45 and the communication interface 44 to the image processor 11.

When the above-described transmission of one film roll amount of scanned image data is completed (step #12), the process issues an instruction for switching over the output switchover circuit 45 of the transmission path branching unit 7 to the mode for outputting the scanned image data from the film scanner 2 on signal path A to the communication interface 44 (step #13).

[General Construction of Exposing/Developing Device EP]

As shown in FIG. 1, the exposing/developing device EP includes, inside its housing, an exposure unit 20 for exposing the print paper 1 with the image of the exposure scanned image data received from the image inputting device IR, an exposure controller 21 for controlling the exposure unit 20, a developing device 22 for developing the print paper 1 exposed by the exposure unit 20, and a print paper transporting mechanism PT for transporting, by means of many transport rollers 25 or the like, the print paper 1, which is drawn out of either one of print paper magazines 23 disposed on the top of the housing, to the developing device 22. The exposure unit 20 comprises a PLZT optical shutter type including an exposure head 20a having an array of PLZT micro optical shutter elements.

Therefore, the exposure unit 20 and the exposure controller 21 together constitute printing means EX for printing images on the image recording medium PM based on the printing image data.

Outside the housing the exposing/developing device EP, there are provided a sorter (not shown) for sorting each strip of print paper 1 developed and then dried by the developing device 22 according to a customer's order and a conveyor 27 for conveying the print paper 1 discharged from an outlet of the developing device 22 to the sorter.

Further, in midway of the transport passage of the print paper transporting mechanism PT, there is provided a cutter 28 for cutting the elongate print paper 1 drawn out of the print paper magazine 23 to a predetermined print size.

[Making of Photographic Print]

Next, operations for making photographic prints by the photographic printing system DP having the above-described construction will be explained briefly.

When an operator inputs an instruction for making photographic prints of images of frames of a photographic film, the main controlling device 6 instructs the film scanner 2 to read (scan) the photographic film. Then, as sequentially receiving the scanned image data of the film from the film scanner 2, the controller stores the data in the memory incorporated in the image processor 11. In parallel with this, the same scanned image data is written into the image data storage apparatus IS.

On the other hand, when the operator inputs an instruction for making photographic prints based on scanned image data recorded in a recording medium such as memory car, MO, CD-R or the like, the main controlling device 6 instructs image data reading operation to a corresponding drive unit of the external I/O device 4. Then, as sequentially receiving the scanned image data from the drive unit, the controller stores the data in the memory.

Further alternatively, when an order for making of re-prints of a photographic film is received from a customer who has placed an order for prints of the same film previously, the operator inputs, from the control panel 6b, the ID code of that photographic film on which the re-print order was placed previously. Then, in accordance with this inputted instruction, the corresponding scanned image data is sequentially retrieved from the image data storage apparatus IS and then stored into the memory of the image processor 11.

Then, the main controlling device 6 displays on the monitor 6a a simulation image obtained by the simulation arithmetic unit 10 based on the inputted scanned image data.

By observing this simulation image displayed on the monitor 6a, if necessary, the operator inputs image correcting instruction information from the control panel 6b.

Then, the main controlling device 6 generates exposure image data by the image processor 11 with taking the inputted image correcting instruction information into consideration and then transmits this data to the exposure controlling device 21.

Upon detection of arrival of the leading end of the print paper 1 at a predetermined exposure staring position based on transportation information of the print paper 1 obtained from the print paper transporting mechanism PT, the exposure controlling device 21 sequentially transmits the exposure image data to the exposure unit 20 at a rate corresponding to the exposing speed of this exposure unit 20.

The exposure unit 20 operates the respective optical shutter elements of the exposure head 20a according to the received exposure image data, thereby to form latent images of the print images on the print paper 1.

Thereafter, the print paper 1 exposed by the exposure unit 20 is transported by the print paper transport mechanism PT to the developing device 22, in which the print paper 1 is developed as it is caused to pass respective developing tanks thereof one after another. The developed print paper 1 is dried and then discharged from the outlet onto the conveyer 27 and then sorted by the sorter according to the customer's order.

[Other Embodiments]

Other embodiments of the invention will be described next.

(1) In the foregoing embodiment, the transport path branching unit 7 is provided for forming the branch transport path 7a for allowing the scanned image data being transmitted from the film scanner 2 to the image processor 11 to be directly transmitted also to the hard disc unit 31. Alternatively, the branching between the transmission path for transmitting the data to the image processor 1 and the branch transmission path 7a may be provided more upstream at the output port for the film scanner 2 to transmit the scanned image data.

(2) In the foregoing embodiment, the hard disc units 31 are employed as the image data recording means IM. Instead, other kinds of rewritable storage (recording) media such as semiconductor memories or the like may be employed.

(3) In the foregoing embodiment, in order to divide the scanned image data received from the film scanner 2 and distribute them to the plurality of hard disc units 31, the connection between the HDD controllers 32 and the data lines of the data bus 38 are divided physically. Instead, all of the 64 bits width data lines of the data bus 38 may be connected to the respective HDD controllers 32, so that each HDD controller selects therein appropriate 16 bits amount of the data.

(4) In the foregoing embodiment, the printing means EX comprises the PLZT optical shutter type exposure unit 20 for exposing images on the print paper 1 for making prints. Instead of this, prints may be made by a so-called laser exposure type image exposing device. Further alternatively, inkjet printing means may be employed for forming images on various types of recording papers. In these ways, the specific construction for making the prints may vary as desired.

The invention may be embodied in any other manner as described above. Further changes or modifications will be apparent for those skilled in the art from the foregoing disclosure within the scope of the invention defined in the appended claims.

What is claimed is:

1. An image data storage apparatus to be connected to a photographic printing system including a film reader for reading images of frames of a photographic film, an image processor for generating image data to be printed, based on scanned image data generated from the film reader, and a printing means for printing images on a recording medium based on the printing image data, the image data storage apparatus storing the scanned image data, the apparatus comprising:

an image data recording means for retrievably recording the scanned image data;

a branch transmission path for allowing the scanned image data being transmitted from the film reader to the image processor to be transmitted also to said image data recording means; and means for switching over between a mode for transmitting the scanned image data from the film reader to the image processor and a further mode for transmitting the scanned image data retrieved from said image data recording means to the image processor.

2. The image data storage apparatus as defined in claim 1, further comprising a transmission path branching unit for connecting said branch transmission path to an intermediate position on a data transmission path from the film reader to the image processor.

3. The image data storage apparatus as defined in claim 1, wherein said image data recording means is adapted for storing the scanned image data in a plurality of hard disc units and also for dividing the scanned image data received from the film reader to be distributed to the plurality of hard disc units to be stored therein respectively; and the apparatus further comprises writing controlling means for causing the respective hard disc devices to write the distributed data therein in a parallel manner.

4. The image data storage apparatus as defined in claim 3, wherein said writing controlling means designates a writing position of the scanned image data for each hard disc unit such that the unit writes the data sequentially in consecutive physical sectors of the unit.

* * * * *